Patented Feb. 6, 1951

2,540,182

UNITED STATES PATENT OFFICE 2,540,182

TREATMENT OF FLOCCULABLE AND DEFLOCCULABLE MATERIAL

Charles Gerald Albert, McIntyre, Ga., assignor to Edgar Brothers Company, Metuchen, N. J., a corporation of New Jersey No Drawing. Application May 17, 1949, Serial No. 93,821

5 Claims. (Cl. 159—48)

This invention relates to the treatment of flocculable and deflocculable material, particularly non-metallic materials which it is desired for commercial purposes to have in dry finely divided form, e. g., a powder or fine pellets. Examples of the general class of materials with which I am concerned are mineral pigments such as metal oxides, calcium carbonate, clay, titanium dioxide, alumina hydrate, etc. Materials of this sort are found in nature, or, if manufactured, exist, in varying degrees of purity and in various states of agglomeration and subdivision. In order to put them into commercial form resort must be had to such treatments as removal of foreign substances, size classification, bleaching, etc. Generally speaking, materials of the class with which I am concerned are admixed with water for some or all of these treatments and it therefore becomes necessary to remove the water in order to bring the material to its desired ultimate physical form.

Various water removal schemes have been practiced, among which may be mentioned settling tanks, filter presses and centrifugal dryers, all based on gravitational or mechanical principles, and drum dryers, vacuum dryers and spray dryers functioning on thermal principles. Each of these schemes has its commercial advantages and disadvantages. The devices which work on gravitational or mechanical principles have the advantage of removing a substantial amount of water at relatively low cost, but, generally speaking, are incapable of drying the material fully. Those processes working on thermal principles are capable of reducing the material to the desired state of dryness but are open to various objections, e. g., the caking of the dried material with consequent need for subsequent grinding (as in drum dryers), the necessity of a high initial water content (as in spray dryers) and fuel costs which are dependent upon the amount of water that must be removed.

I have discovered that a selected group of the materials within my contemplation may be more effectively and economically treated by the invention herein described. I confine my treatment to that class of materials which may be flocculated or deflocculated in an aqueous medium. I take the material in the flocculant state and with such a limited quantity of water that the mass is plastic or pasty. I add a deflocculating agent to the mass and distribute it therethrough so as to deflocculate the mass. The effect of this is to reduce the mass to a substantially uniform condition of lower viscosity than that of the original flocculant mass. I have found that in this state the mass may be effectively treated in a spray dryer with marked advantage and economy. The amount of water that needs to be removed by the relatively expensive method of spray drying is vastly reduced and corresponding economies are effected. At the same time the viscosity of the mass is so low that highly advantageous spray-drying conditions can be observed and in consequence it is possible to treat material so that it will be in dry form, either a fine powder or pellet-like, as may be desired in the particular case.

The deflocculating agent will of course be selected depending upon the material being treated. Examples of deflocculating agents which may be used for deflocculating various flocculant materials are tetrasodium pyrophosphate, disodium dihydrogen pyrophosphate, ammonium hydroxide, sodium hexametaphosphate, sodium tripolyphosphate, sodium or calcium lignosulphonate, salts of condensed napththalene sulfonic acids, etc.

The deflocculating agent may be introduced in the form of a water solution and, indeed, will ordinarily be introduced in that form. However, the quantity of deflocculating agent introduced is a small proportion of the mass being treated so the water added as a solvent for the deflocculating agent is not a substantial amount. In the claims the phrase "limiting the water content of the mass to not over 10% greater than the initial water content" or "limiting the water content of the mass to not over 10% greater than the amount of water remaining therein after the initial water removal step" contemplates such relatively small addition of water as will occur by reason of adding the deflocculating agent in water solution form. In other words, the amount of water thus added is not a substantial amount within the meaning of the claims. The water content of the mass should be limited to not over 10% greater than before adding the deflocculating agent. If a substantially greater amount of water is added the advantages of my invention are minimized since an undesirable amount of water must be evaporated in the spray dryer in the production of a given amount of spray-dried material.

I shall give examples of the practice of my invention.

*Example I*

A calcined water-ground lithopone pigment was dewatered by sedimentation and decantation to produce a slurry containing 45% solids. This slurry had a viscosity of 390 centipoises as measured on a Brookfield viscosimeter at 60 R. P. M. It was suitable for spray drying but necessitated the evaporation of 1.2 tons of water per ton of dry pigment produced. Filtration of the slurry on a continuous vacuum filter produced a solid cake containing 74% solids. This cake was mixed with approximately one percent of its weight of a partially desulfonated sodium lignosulfonate, whereupon the solid cake was liquefied to a slurry containing 74% solids by weight and having a viscosity of only 278 centipoises as measured on a Brookfield viscosimeter at 60 R. P. M. This slurry was well adapted for spray drying, and required the evaporation of only 0.35 ton of water per ton of dry pigment produced.

Example II

A precipitated iron yellow pigment could be thickened by sedimentation to only 35% solids. The thickened suspension had a viscosity as measured on a Brookfield viscosimeter at 60 R. P. M. of 468 centipoises and was adapted for spray drying but required the evaporation of 1.85 pounds of water per pound of pigment produced. Filtration on a vacuum filter produced a cake which contained 47% dry solids but was not adapted for spray drying. This cake was deflocculated with a small amount of sodium lignosulfonate to produce a liquid slurry with the same solids content but a viscosity of only 420 centipoises as measured on a Brookfield viscosimeter at 60 R. P. M. This slurry was well adapted for spray drying and required the evaporation of only 1.13 pounds of water per pound of pigment thereby increasing the productive capacity of the spray drying unit nearly 65%.

Example III

A refined china clay suitable for use as a pigment for coating paper was prepared by deflocculating a crude clay and removing therefrom the grit and coarser clay particles, bleaching and reflocculating the fine particles, and removing water by sedimentation and decantation. These steps produced a slurry containing 27% clay by weight, the remaining 73% consisting of water. This slurry had a viscosity as measured on a Brookfield viscosimeter at 60 R. P. M. of 406 centipoises and was adapted for spray drying but because of its low solids content required the evaporation of 5400 pounds of water per ton of dry clay produced. This made it uneconomical to spray dry this material so that the advantages of spray drying could not be attained.

Filtration of this slurry on a continuous vacuum filter produced a cake containing 62.5% solids by weight, the cake being a relatively thick plastic mud not suited for spray drying. A 5% aqueous solution of tetrasodium pyrophosphate was added to and mixed with the cake in sufficient quantity to provide approximately 0.2% of tetrasodium pyrophosphate on the basis of the weight of the clay. This liquefied the cake, producing a deflocculated suspension containing 61% solids by weight and having a viscosity as measured on a Brookfield viscosimeter at 60 R. P. M. of only 41 centipoises.

This suspension was well adapted for spray drying. It atomized very well and had an evaporative requirement of only 1280 pounds of water per ton of dry clay produced. This made spray drying of this product economical and thus made possible the production of the clay in the form of a readily dispersible powder without any grinding or pulverizing operation.

Example IV

A precipitated calcium carbonate of a grade suitable for use as a pigment could be thickened by sedimentation to only 29% solids. The thickened suspension had a viscosity of 584 centipoises as determined with a Brookfield viscosimeter at 60 R. P. M. It was adapted for spray drying but its low solids content resulted in a yield of only 0.41 ton of dry product per ton of water evaporated, thus making spray drying relatively costly both in terms of fuel consumption and size of equipment required to give the desired productive capacity. Filtration of this suspension on a continuous rotary vacuum filter produced a cake containing 67% solids by weight, but with physical characteristics making it unadapted for spray drying. This cake was mixed with one-third of one percent of its weight of a partially desulfonated sodium lignosulfonate, whereupon it was liquefied to a suspension of the same solids content but having a viscosity as measured on a Brookfield viscosimeter at 60 R. P. M. of only 150 centipoises. This suspension was very well adapted for spray drying and made possible a yield of slightly over two tons of dry product per ton of water evaporated thus greatly reducing the cost of obtaining the advantages imparted to the product by spray drying.

Normally the existence in the spray-dried material of small residual amounts of deflocculating agent which may be present is not detrimental in the use of the material. However, when in certain cases spray-dried material free from residual amounts of deflocculating agent is desired the deflocculating agent will be selected so that any residual amounts thereof remaining after the deflocculating agent is distributed throughout the material will be evaporated in the spray drier.

The quantity of deflocculating agent used for deflocculating any particular mass will of course be selected by those skilled in the art to most effectively accomplish the purpose. I do not claim to have invented the deflocculation of material or to have discovered any particular deflocculating agents. Those skilled in the art with the teaching of my specification before them will have no difficulty in selecting an appropriate deflocculating agent for each material to be treated and in determining the amount of such agent which should be employed.

While I have described certain present preferred methods of practicing the invention it is to be distinctly understood that the invention is not limited thereto but may be otherwise variously practiced within the scope of the following claims.

I claim:

1. In the treatment of material which is flocculable and deflocculable, the steps consisting in adding a deflocculating agent to an initially viscous mass whose constituents are water and flocculant deflocculable material while limiting the water content of the mass to not over 10% greater than the initial water content, distributing the deflocculating agent throughout the mass and thereby deflocculating the deflocculable material and reducing the mass to a substantially uniform condition of materially lower viscosity than that of the original mass and spraying into an evaporating zone the mass of materially lower viscosity thus formed.

2. In the treatment of material which is flocculable and deflocculable, the steps consisting in removing water from a fluid mass whose constituents are water and flocculant deflocculable material and thereby materially increasing the viscosity of the mass, adding a deflocculating agent to the mass while limiting the water content of the mass to not over 10% greater than the amount of water remaining therein after the initial water removal step, distributing the deflocculating agent throughout the mass and thereby deflocculating the deflocculable material and reducing the mass to a substantially uniform condition of materially lower viscosity than that of the mass after the initial water removal step and spraying into an evaporating zone the mass of materially lower viscosity thus formed.

3. In the treatment of material which is flocculable and deflocculable, the steps consisting in adding a deflocculating agent to a mass whose constituents are water and flocculant deflocculable material which is initially so viscous as not to be adapted for spray-drying while limiting the water content of the mass to not over 10% greater than the initial water content, distributing the deflocculating agent throughout the mass and thereby deflocculating the deflocculable material and reducing the mass to a substantially uniform condition of materially lower viscosity than that of the original mass so that it is adapted for spray-drying and spraying into an evaporating zone the mass of materially lower viscosity thus formed.

4. In the treatment of material which is flocculable and deflocculable, the steps consisting in mechanically removing water from a fluid mass whose constituents are water and flocculant deflocculable material and thereby materially increasing the viscosity of the mass, adding a deflocculating agent to the mass while limiting the water content of the mass to not over 10% greater than the amount of water remaining therein after the initial water removal step, distributing the deflocculating agent throughout the mass and thereby deflocculating the deflocculable material and reducing the mass to a substantially uniform condition of materially lower viscosity than that of the mass after the initial water removal step and spraying into an evaporating zone the mass of materially lower viscosity thus formed.

5. In the treatment of material which is flocculable and deflocculable, the steps consisting in mechanically removing water from a fluid mass whose constituents are water and flocculant deflocculable material and thereby materially increasing the viscosity of the mass so that it becomes so viscous as not to be adapted for spray-drying, adding a deflocculating agent to the mass while limiting the water content of the mass to not over 10% greater than the amount of water remaining therein after the initial water removal step, distributing the deflocculating agent throughout the mass and thereby deflocculating the deflocculable material and reducing the mass to a substantially uniform condition of materially lower viscosity than that of the mass after the initial water removal step so that it is adapted for spray-drying and spraying into an evaporating zone the mass of materially lower viscosity thus formed.

CHARLES GERALD ALBERT.

REFERENCES CITED

The following references are of record in the file of this patent:

UNITED STATES PATENTS

| Number | Name | Date |
| --- | --- | --- |
| 1,000,931 | Merrell et al. | Aug. 15, 1911 |
| 2,260,871 | Sawyer | Oct. 28, 1941 |
| 2,296,066 | Sloan | Sept. 15, 1942 |
| 2,440,601 | Dickerman | Apr. 27, 1948 |
| 2,500,972 | Wilson | Mar. 21, 1950 |